(12) United States Patent
Frohlich et al.

(10) Patent No.: US 10,570,846 B2
(45) Date of Patent: Feb. 25, 2020

(54) INTERNAL COMBUSTION ENGINE

(71) Applicant: INNIO Jenbacher GmbH & Co OG, Jenbach (AT)

(72) Inventors: Moritz Frohlich, Munster (AT); Johannes Huber, Kramsach (AT); Herbert Schaumberger, Munster (AT); Klaus Zoggeler, Kitzbuhel (AT)

(73) Assignee: INNIO JENBACHER GMBH & CO OG, Jenbach (AT)

(*) Notice: Subject to any disclaimer, the term of this patent is extended or adjusted under 35 U.S.C. 154(b) by 48 days.

(21) Appl. No.: 16/061,241

(22) PCT Filed: Dec. 22, 2016

(86) PCT No.: PCT/AT2016/060134
§ 371 (c)(1),
(2) Date: Oct. 10, 2018

(87) PCT Pub. No.: WO2017/112970
PCT Pub. Date: Jul. 6, 2017

(65) Prior Publication Data
US 2019/0032589 A1 Jan. 31, 2019

(30) Foreign Application Priority Data
Dec. 29, 2015 (AT) .................... 51112/2015

(51) Int. Cl.
*F02D 41/22* (2006.01)
*F02D 41/14* (2006.01)
(Continued)

(52) U.S. Cl.
CPC .......... *F02D 41/22* (2013.01); *F02B 19/1004* (2013.01); *F02D 41/1498* (2013.01);
(Continued)

(58) Field of Classification Search
CPC .. F02D 41/22; F02D 41/1498; F02D 41/1446; F02D 2041/224; F02B 19/1004; F02P 17/12
See application file for complete search history.

(56) References Cited

U.S. PATENT DOCUMENTS 6,155,212 A * 12/2000 McAlister ............... F02B 43/08
123/25 B
2004/0187847 A1 9/2004 Viele et al.

FOREIGN PATENT DOCUMENTS

DE 39 33 826 A1 4/1990
DE 197 50 636 A1 5/1998
(Continued)

OTHER PUBLICATIONS

Office Action issued in connection with corresponding AT Application No. A51112/2015 dated Aug. 1, 2016 (English Translation not available).
(Continued)

Primary Examiner — Hieu T Vo
(74) Attorney, Agent, or Firm — Fletcher Yoder, P.C.

(57) ABSTRACT

Internal combustion engine with a controller and at least one combustion chamber and an at least one ignition amplifier associated with the combustion chamber, whereby the at least one combustion chamber, on the one hand via a feeding device for a fuel-air mixture, can be supplied with energy, and on the other hand can be supplied with energy by the associated ignition amplifier, whereby the controller is designed to change the excess-air ratio of the fuel-air mixture in a detection mode for the at least one combustion chamber, and at least one sensor is provided, whose signals can be supplied to the controller and whose signals are characteristic of the combustion event in at least one combustion chamber and that the controller is designed such that, depending on the signals supplied by at least one
(Continued)

sensor, a representative detection signal is generated associated with a status of the at least one ignition amplifier associated with at least one combustion chamber.

15 Claims, 2 Drawing Sheets

(51) Int. Cl.
    *F02P 17/12*     (2006.01)
    *F02B 19/10*     (2006.01)

(52) U.S. Cl.
    CPC .......... *F02P 17/12* (2013.01); *F02D 41/1446* (2013.01); *F02D 2041/224* (2013.01)

(56) References Cited

FOREIGN PATENT DOCUMENTS

| | | |
|---|---|---|
| DE | 10 2014 200 360 A1 | 7/2015 |
| EP | 2 803 966 A1 | 11/2014 |
| JP | 2009-299662 A | 12/2009 |
| JP | 2010-025090 A | 2/2010 |
| JP | 2010-203403 A | 9/2010 |
| JP | 5004034 B2 | 8/2012 |

OTHER PUBLICATIONS

International Search Report and Written Opinion issued in connection with corresponding PCT Application No. PCT/AT2016/060134 dated Mar. 24, 2017.

Office Action issued in connection with corresponding AT Application No. A51112/2015 dated Jul. 19, 2017 (English Translation not available).

Office Action issued in connection with corresponding AT Application No. A51112/2015 dated Oct. 13, 2017 (English Translation not available).

International Preliminary Report on Patentability issued in connection with corresponding PCT Application No. PCT/AT2016/060134 dated Jul. 3, 2018.

* cited by examiner

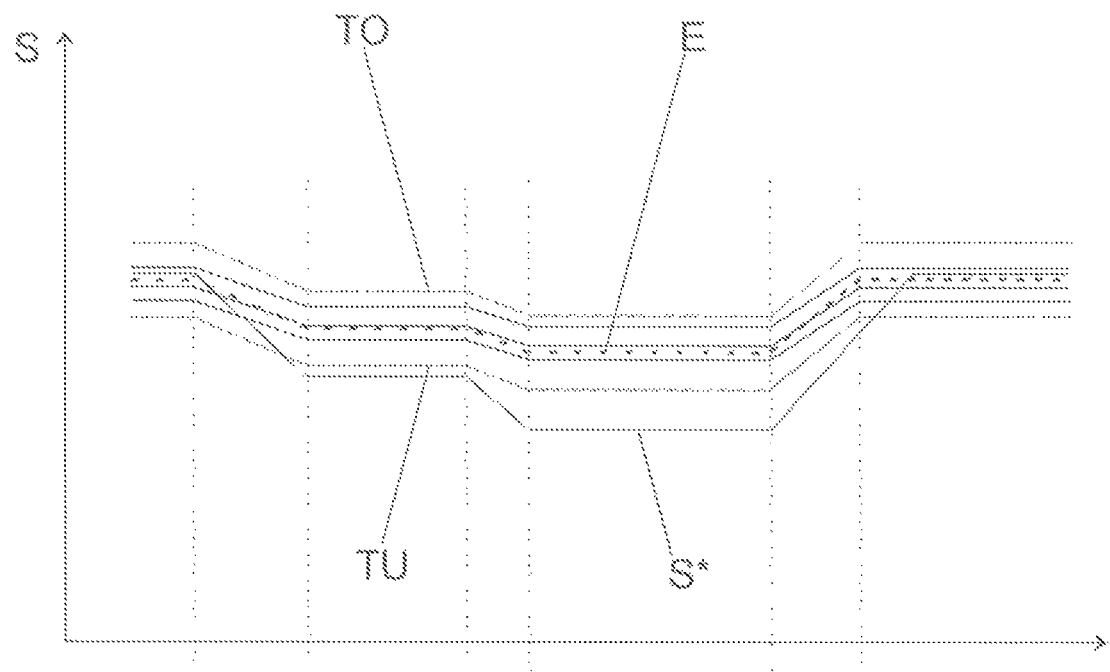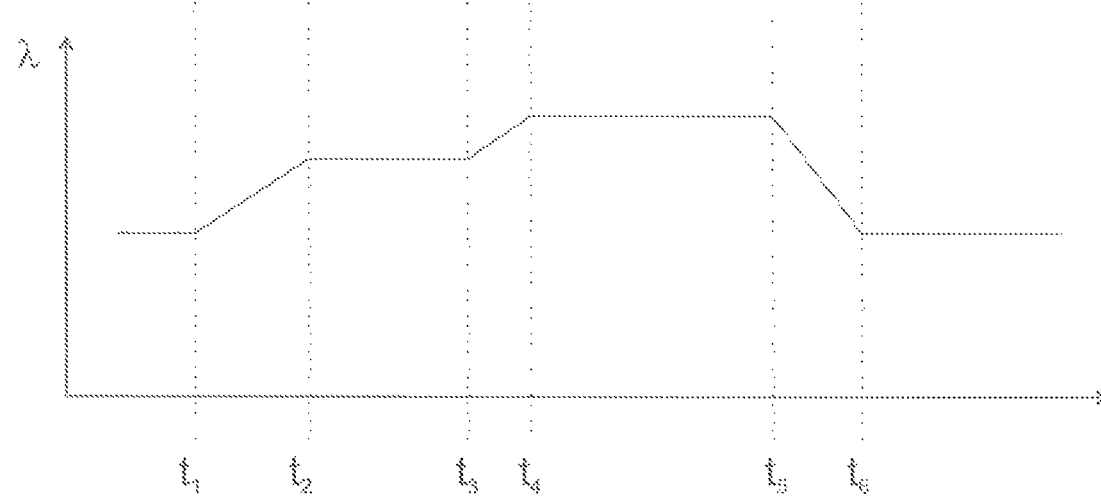

INTERNAL COMBUSTION ENGINE

TECHNOLOGY FIELD

This disclosure relates to an internal combustion engine with the features of claim 1 and a method for checking the status of an ignition amplifier associated with at least one combustion chamber of an internal combustion engine having the features of claim 15.

BACKGROUND

U.S. Pat. No. 8,290,687 B2 describes a method for determining a quantity of diesel introduced into a combustion chamber of an internal combustion engine.

BRIEF DESCRIPTION

The disclosure is used in internal combustion engines operated in lean operation. It is known that the status of an ignition amplifier may deteriorate gradually over a long period of time (and in this sense become abnormal).

The object of the disclosure is to be able to perform an early detection of an impending defect pattern of the ignition amplifier.

This object is achieved by an internal combustion engine with the features of claim 1 and a method with the features of claim 15. Advantageous embodiments of the disclosure are defined in the dependent claims.

By means of the disclosure, a status is brought about by a specific change in the excess-air ratio of the fuel-air mixture for the at least one combustion chamber, in which case a correctly, or at least acceptably, functioning ignition amplifier can bring about ignition of the fuel-air mixture. If the ignition amplifier no longer functions correctly or acceptably, the excess-air ratio that is deliberately changed excessively in a direction disadvantageous to ignition leads to a conspicuous combustion event, or no combustion whatsoever takes place. This is interpreted as a sign of an abnormal status of the ignition amplifier.

For example, the amplifier can be designed as a spark plug. This can be arranged in the combustion chamber itself or in a prechamber associated with the combustion chamber. By means of the disclosure, it is possible, at an early stage, to detect a deterioration in the ignition effect (e.g. due to deposits, changes in the electrode geometry, changes in the geometry of a guide device connected to the spark plug, or other wear or aging phenomena).

Particularly, it is provided that the ignition amplifier has an insertion device for fuel or a fuel-air mixture and is designed as a prechamber or injector for a liquid fuel (e.g. diesel or another self-igniting fuel). In this case, it is possible, at an early stage, to detect a deterioration in the ignition effect of the prechamber or injector (e.g. due to deposits, changes in the electrode geometry, changes in the geometry of a guide device connected to the spark plug, or other wear or aging phenomena).

In particular in the case of large internal combustion engines, it may be helpful, to ensure the reliable ignition of the fuel-air mixture in the combustion chamber, to design the amplifier as a prechamber in which a relatively rich mixture or pure fuel (which can be supplied to the prechamber via its own feeding device—a so-called preflushed prechamber) is ignited and enters the combustion chamber from the ignition torches. In a flushed prechamber, it is usually provided that around half of the energy in the prechamber at the time of ignition comes from the combustion chamber, while the rest is supplied by the fuel or mixture supply the prechamber itself. If e.g. a leaning of the fuel-air mixture in the combustion chamber is now provided, then the prechamber receives less energy and no longer ignites when e.g. too many deposits or the like are present in the prechamber itself, a spark plug of the prechamber or the feeding device (e.g. valve for gas or a gas-air mixture) of the prechamber.

It can be provided that the sensor, whose signals are characteristic of the combustion event in the at least one combustion chamber, is designed to detect a lowering of the exhaust-gas temperature of the combustion chamber or a deterioration in the running smoothness.

It is provided that the controller is designed to control the ignition amplifier in detection mode for introducing an unchanged quantity of energy into the at least one combustion chamber. In this case, therefore, the change in the excess-air ratio does not occur via the amplifier, if the latter has a feeding device for a fuel or a fuel-air mixture, but rather the mixture in the combustion chamber is changed. This is particularly advantageous when the supply of fuel or fuel-air mixture of the ignition amplifier is designed passively, i.e. cannot be directly influenced itself. Quite generally, irrespective of the exemplary embodiment discussed here, the change in the excess-air ratio of the fuel-air mixture for the at least one combustion chamber can be performed, by the methods familiar to the person skilled in the art, by the actuation of suitable control elements.

In order to avoid declines in efficiency of the internal combustion engine in detection mode, it can be provided that the controller is designed to change the charge-air pressure of the at least one combustion chamber via fuel-air mixture supplied to the feeding device, such that the effect of the changed excess-air ratio of the fuel-air mixture on the at least one combustion chamber can be compensated via the energy supplied to the feeding device. This compensation can be performed so that the quantity of fuel is left equal and the quantity of air is increased accordingly.

The change in the excess-air ratio in detection mode can be performed such that the excess-air ratio is increased or decreased. An increase in the excess-air ratio (leaning), in the case of an abnormal feeding device, causes a directed approach toward an operating point in which the abnormal status is particularly noticeable. An decrease in the excess-air ratio (enrichment), in the case of an abnormal feeding device, causes an approach toward an operating point in which the abnormal status (in detection mode) no longer has any effect. The combustion in detection mode then occurs normally. If there is another combustion chamber with a feeding device with normal properties during normal operation, there will initially be no abnormalities in the combustion in detection mode in this combustion chamber. With continued enrichment, abnormalities may occur, since the upper tolerance range for ignition is reached.

It can be provided that the controller is designed to detect, in detection mode, whether the change in the combustion event caused by the fuel-air mixture with a changed excess-air ratio reaches or exceeds a threshold value. When this threshold is reached or exceeded, a detection signal is output by the controller which indicates the status of the associated ignition amplifier as abnormal. The threshold value can be a value previously stored in the controller which originates from empirical values, measurements or physical values. It is also possible to set a tolerance band around the threshold value and output the detection signal only when the tolerance band is reached or exceeded.

It can be provided that the controller is designed to detect, in detection mode, whether the gradient of the change in the combustion event caused by the fuel-air mixture with a changed excess-air ratio reaches or exceeds a threshold value. Measurements have shown that, in the case of ignition amplifiers with abnormal behavior, a faster response to the change in the excess-air ratio occurs. When this threshold is reached or exceeded, a detection signal is output by the controller which indicates the status of the associated ignition amplifier as abnormal. The threshold value can be a value previously stored in the controller which originates from empirical values, measurements or physical values. It is also possible to set a tolerance band around the threshold value and output the detection signal only when the tolerance band is reached or exceeded.

More particularly can be provided that the internal combustion engine has at least two combustion chambers, each associated with an ignition amplifier, whereby each of the at least two combustion chambers is associated with a sensor whose signals can be fed to the controller and whose signals are characteristic of the combustion event in the associated combustion chamber.

In such an internal combustion engine, the controller can be designed to compare the signals of the at least two combustion chambers in detection mode and to determine in which of the at least two combustion chambers the greater change has occurred in response to the change in the excess-air ratio. For that combustion chamber in which the greater deviation has occurred, the controller can output a detection signal that identifies the status of the associated ignition amplifier as abnormal.

Such an internal combustion engine can also have at least three combustion chambers, each associated with an ignition amplifier, whereby each of the at least three combustion chambers is associated with a sensor whose signals can be fed to the controller and whose signals are characteristic of the combustion event in the associated combustion chamber. In this case, the controller is designed to detect in which of the at least three combustion chambers the greatest change has occurred relative to a predetermined statistical characteristic value. For that combustion chamber in which the greater deviation has occurred, the controller can output a detection signal that identifies the status of the associated ignition amplifier as abnormal.

The internal combustion engine can also have a plurality of combustion chambers with associated ignition amplifiers, and the controller can be designed to change the excess-air ratio selectively in detection mode for one or more combustion chambers so as to generate a detection signal identifying the status of the associated ignition amplifier as abnormal.

Examples of possible sensors whose signals are characteristic of the combustion event in at least one combustion chamber include:
  Temperature sensor for exhaust gas discharged from the combustion chamber or the combustion chamber itself
  Cylinder pressure sensor
  Knock sensor (structure-borne sound sensor)
  Ion current sensor The disclosure can be used in a stationary internal combustion engine, for marine applications or mobile applications such as so-called "non-road mobile machinery" (NRMM), as a reciprocating piston engine. The internal combustion engine can be used as a mechanical drive, e.g. for operating compressor systems or coupled with a generator to a genset for generating electrical energy.

The fuel used for combustion in the combustion chambers is gas (e.g. natural gas).

BRIEF DESCRIPTION OF THE DRAWINGS

Exemplary embodiments of the disclosure will be discussed with reference to the figures.

FIGS. 2A and 2B show schematically the signals S (solid line) of different combustion chambers 3.

DETAILED DESCRIPTION

Figure 1:
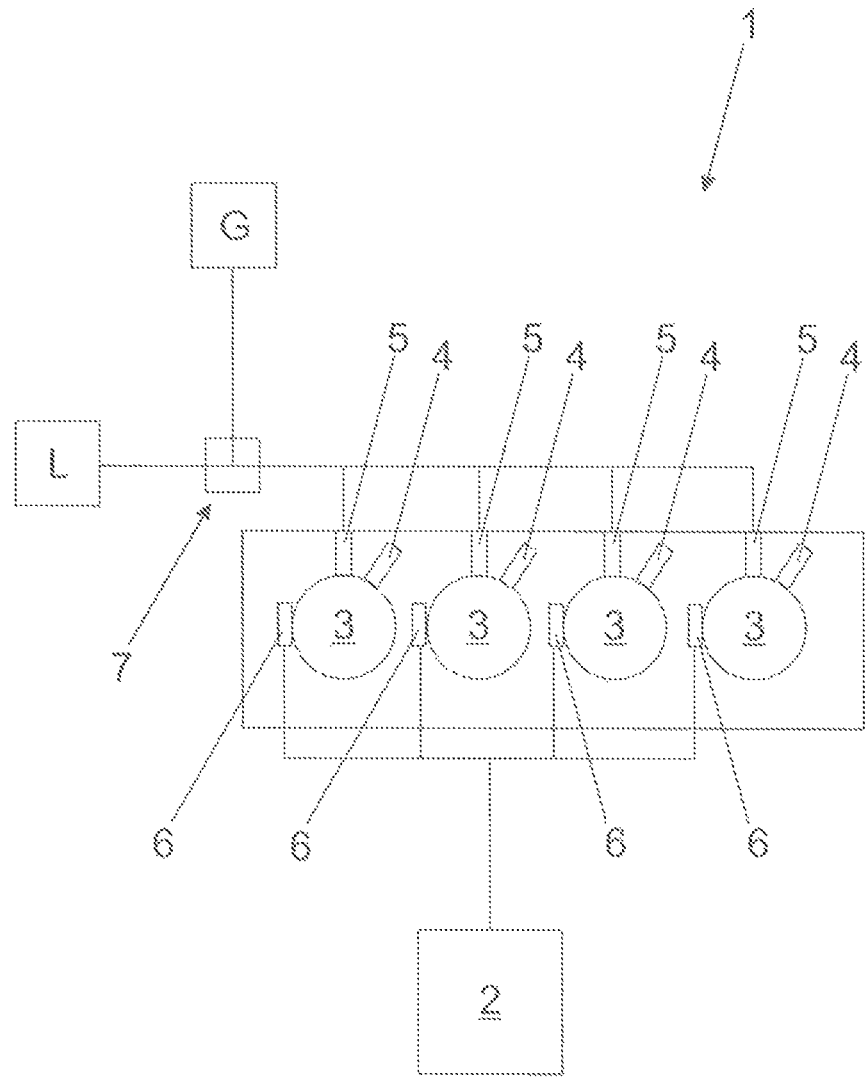
FIG. 1 shows schematically the structure of an internal combustion engine 1 according to the disclosure.

FIG. 1 shows schematically the structure of an internal combustion engine 1 according to the disclosure. It includes the following:
  a controller 2
  combustion chambers 3
  ignition amplifiers 4 associated with the combustion chambers 3
  feeding devices 5 associated with the combustion chambers 3
  sensors 6 associated with the combustion chambers 3

The feeding devices are supplied by means of a gas mixer 7, which gas mixer 7 mixes air L and fuel (in this case, gas G) into a gas-air mixture having a certain excess-air ratio $\lambda$. The excess-air ratio $\lambda$ can be influenced by means of various control elements. In addition to the gas mixer 7, examples would also include a turbo bypass line, a wastegate or other control elements known to the person skilled in the art. Feeding devices for the ignition amplifier 4 (here prechamber) are not shown, because they are well known in the prior art (e.g. prechamber gas valves connected to a source of gas or a gas-air mixture).

The arrangement of the sensors 6 should be understood to be purely schematic and depends on the selection of the type of sensors 6.

FIGS. 2A and 2B show schematically the signals S (solid line) of different combustion chambers 3 (here, by way of example, four different combustion chambers 3) associated with sensors 6 and the excess-air ratio $\lambda$ as a function of time t. In this case, a signal S* was selected whose excessively strong or rapid decrease indicates an abnormal behavior, e.g. a temperature signal.

At the time $t_1$ until the time $t_2$, a first change in the excess-air ratio $\lambda$ occurs for all four combustion chambers 3, in this case in the direction of leaning. Between the times $t_2$ and $t_3$, the excess-air ratio $\lambda$ is kept constant. At the time $t_3$ until the time $t_4$, a second change in the excess-air ratio $\lambda$ occurs for all four combustion chambers 3, in this case in the direction of leaning. Between the times $t_4$ and $t_5$, the excess-air ratio $\lambda$ is kept constant. At the time is until the time $t_6$, a third change in the excess-air ratio $\lambda$ to a constant value occurs for all four combustion chambers 3. The controller 2 is in detection mode between the times $t_1$ and $t_6$.

It can be seen that, in this example, the signals S excluding S* have a similar behavior. The signal S* has an abnormal behavior, because this signal S* decreases more rapidly and strongly. The controller 2 can thus generate a detection signal which shows that the combustion chamber 3 associated with this ignition amplifier 4 (currently only in the loading case) responds abnormally and must therefore be checked or replaced.

The three normal signals S can be used to form a statistical characteristic value in the form of an expected value E or a median. Such a characteristic value can also come from a model. Using the expected value E, a tolerance band can be defined by setting a maximum distance from the expected value E. In FIG. 2A, the tolerance band is illustrated by its upper limit TU and its lower limit TL (both shown as dotted lines). The detection signal can be generated when the indicated tolerance band is exceeded. Alternatively, the detection signal can be generated when a gradient of a signal S* exceeds a threshold. Analogously, the limit value for the gradients can also be determined from a statistical characteristic value (e.g. median or mean), e.g. with an offset.

The invention claimed is:

1. Internal combustion engine comprising:
a controller;
at least one combustion chamber;
at least one sensor operable to produce signals supplied to the controller; and
at least one ignition amplifier associated with the combustion chamber; wherein the at least one combustion chamber via a feeding device for a fuel-air mixture is supplied with energy, or is supplied with energy by the at least one ignition amplifier; wherein the controller changes an excess-air ratio of the fuel-air mixture in a detection mode for the at least one combustion chamber;
wherein the at least one sensor produces signals characteristic of a combustion event in the at least one combustion chamber; and
wherein the controller, depending on the signals supplied by at least one sensor, generates a representative detection signal associated with a status of the at least one ignition amplifier associated with the at least one combustion chamber.

2. The internal combustion engine according to claim 1, wherein the at least one ignition amplifier is designed as a spark plug.

3. The internal combustion engine according to claim 1, wherein the at least one ignition amplifier has an insertion device for fuel or a fuel-air mixture and is operable as a prechamber or injector for a liquid fuel.

4. The internal combustion engine according to claim 3, wherein the controller controls the at least one ignition amplifier in detection mode for introducing an unchanged quantity of energy into the at least one combustion chamber.

5. The internal combustion engine according to claim 1, wherein the controller changes a charge-air pressure of the at least one combustion chamber via the fuel-air mixture supplied to a feeding device, to effect compensation the changed excess-air ratio of the fuel-air mixture on the at least one combustion chamber via the energy supplied to the feeding device.

6. The internal combustion engine according to claim 1, wherein the controller increases the excess-air ratio in detection mode.

7. The internal combustion engine according to claim 1, whereby the controller is designed to reduce the excess-air ratio in detection mode.

8. The internal combustion engine according to claim 1, wherein the controller detects, in detection mode, whether a change in a combustion event caused by the fuel-air mixture with a changed excess-air ratio reaches or exceeds a threshold value.

9. The internal combustion engine according to claim 1, wherein the controller detects, in detection mode, whether a gradient of a change in a combustion event caused by the fuel-air mixture with a changed excess-air ratio reaches or exceeds a threshold value.

10. The internal combustion engine according to claim 1, wherein at least two combustion chambers are provided, each of which is associated with an ignition amplifier, wherein each of the at least two combustion chambers is associated with the sensor generating signals fed to the controller and which signals are characteristic of a combustion event in the associated combustion chamber.

11. The internal combustion engine according to claim 10, wherein the controller compares the signals of the at least two combustion chambers in detection mode and determines in which of the at least two combustion chambers a greater change has occurred in response to the change in the excess-air ratio.

12. The internal combustion engine according to claim 10, wherein at least three combustion chambers are provided, each of which is associated with an ignition amplifier, wherein each of the at least two combustion chambers is associated with the sensor generating signals fed to the controller and which signals are characteristic of a combustion event in the associated combustion chamber, and wherein the controller detects in which of the at least three combustion chambers a greatest change has occurred relative to a predetermined statistical characteristic value.

13. The internal combustion engine according to claim 1, wherein the internal combustion engine has a plurality of combustion chambers with associated ignition amplifiers and the controller selectively changes, in detection mode for one or more combustion chambers, the excess-air ratio and generates the detection signal.

14. The internal combustion engine according to claim 1, wherein the sensor generates signals characteristic of a combustion event in the at least one combustion chamber, and detects a lowering of an exhaust-gas temperature of the at least one combustion chamber or a deterioration in running smoothness.

15. A method for checking a status of an ignition amplifier associated with at least one combustion chamber of an internal combustion engine, comprising: for the at least one combustion chamber, changing the excess-air ratio of a fuel-air mixture; and inferring as a function of a characteristic signal for a combustion event in the at least one combustion chamber, the status of the ignition amplifier associated with the at least one combustion chamber.

* * * * *